United States Patent [19]

Rabeler

[11] 3,998,977
[45] Dec. 21, 1976

[54] PROCESS FOR PRODUCING FRUIT FLAKES OR WAFERS, AND FRUIT FLAKES OR WAFERS PRODUCED IN ACCORDANCE THEREWITH

[76] Inventor: Hans H. Rabeler, 23 Jordan St., 8190 Wolfratshausen, Germany

[22] Filed: Jan. 20, 1976

[21] Appl. No.: 650,746

Related U.S. Application Data

[63] Continuation of Ser. No. 432,711, Jan. 11, 1974, abandoned.

[30] Foreign Application Priority Data

Jan. 18, 1973  Germany .......................... 2302242

[52] U.S. Cl. .............................. 426/144; 426/616; 426/639; 426/640; 426/473
[51] Int. Cl.² ...................... A23B 7/02; A23B 7/08
[58] Field of Search ........................... 426/473, 465

[56] References Cited

UNITED STATES PATENTS

| | | | |
|---|---|---|---|
| 2,435,842 | 2/1948 | Northcutt et al. | 426/473 |
| 3,259,508 | 7/1966 | Aguirre et al. | 426/640 |

*Primary Examiner*—Jeanette M. Hunter
*Attorney, Agent, or Firm*—Bierman & Bierman

[57] ABSTRACT

Fruit flakes made by applying a moist mass of fruit pulp, sugar and starchy material to a hot smooth substrate in a thin layer, at least partially dehydrating said layer to form a cohesive film, peeling said film from said substrate and forming said film into an irregular structure, drying said film until it is brittle, and dividing said film into flakes.

18 Claims, No Drawings

PROCESS FOR PRODUCING FRUIT FLAKES OR WAFERS, AND FRUIT FLAKES OR WAFERS PRODUCED IN ACCORDANCE THEREWITH

This is a Rule 60 Continuation Application of co-pending Ser. No. 432,711 filed Jan. 11, 1974 now abandoned, the priority of which is hereby claimed, which itself claimed the priority of German application P 23 02 242.6 filed on Jan. 18, 1973.

The invention concerns a process for producing fruit flakes or fruit wafers from fruits. Especially preferred are oranges, apricots, pineapples, bananas and guavas. The invention further concerns fruit flakes or wafers produced from such fruits according to this or to an equivalent process.

The invention is based on the need for a process which makes it possible to produce fruit flakes or wafers relatively simply and cheaply and in great quantities, and which will provide products that are both tasty and nutritious.

This problem is solved according to this invention by utilizing a moist, practically homogeneous mass of material, which consists essentially of fruit pulp or the like, with sugar or sugar-like materials added, and of starchy substances, especially cereals, such as, for example, corn meal. This mass is applied to a hot smooth substrate in at least one relatively thin layer. Through dehydration, it is brought to the cohesive, malleable or thermoplastic state. It is then peeled off the hot substrate. Preferably simultaneously or shortly afterwards, it is continuously packed, compressed, or restrained, and/or, if necessary, pulled or tugged, in such a way that the material preferably attains an irregular, corrugated, knurled, or waffle-like structure, with varying thicker and thinner thicknesses. The film with this structure is then cooled, completely dried, and finally cut into pieces or divided into more or less regularly shaped flakes or wafers.

The invention brings to the market a new foodstuff and delicacy, at a price that can be afforded by all. As a pure, vitamin containing, natural product, it has high nutritional value, and can be used by itself or as a frequent additive for various dishes. As a consequence of their special structure, which is due to the invention, the fruit flakes remain loose and crunchy during storage and use, look appealing, taste pleasantly tart and very fruity, and are free of harmful components or impermissible foreign additives.

Fresh fruits, as well as pasteurized or frozen ones, can be used as raw material, in the form of fruit pulp, fruit puree, strained and homogenized fruits. By the expression "fruit pulp", these and similar forms of fruit mass are intended to be covered. Corn meal or any similar product is preferred as starch additive, because of its attractive price and because of its special suitability for the purposes of the invention. The general designation "sugar" designates beet sugar as well as cane sugar, as well as molasses, glucose, etc. In the process according to the invention, a caramelizing effect is important for the mass of material.

As an example of the preferred form of the invention, the composition of the moist mass contains about 80 – 85% fruit pulp or the like, 5 – 10% sugar or the like, and 5 – 10% starchy material, such as cereals or the like, in weight percent. The weight ratio of moist material to dry material is preferably about 3 : 1. Thus, for example, 300 kg moist material yield about 100 kg dry material. It should further be noted that, under some circumstances, the addition of special ingredients, such as taste improving materials, vitamins, spices, etc. is possible, without any change in the basic composition of the material mass.

In particular, the process according to the invention can be performed in several variants. The moist material mass, for example, can be applied to a smooth flat substrate. But for practical manufacture, a rotating heated drying drum or drying cylinder is preferred. The moist material mass comes from a storage or mixing container, and is applied to this drying cylinder at one or more sites, and is evenly distributed. For this purpose, one or more sequentially arranged application rollers, which are in themselves well-known, are used. The width of the drying cylinder is chosen arbitrarily. For example, it can be 2.50 m. If two or more application rollers are provided, fresh material mass is applied in front of each application roller and is distributed over the width of the drying cylinder. The drying cylinder is advantageously heated by saturated steam, which is introduced through the interior of the cylinder. The steam is at a pressure of 4 – 6 atmospheres, and the attained temperature ranges for 110° to 140° C. Vapors formed from the material mass during desiccation are pumped off with a suitable device. The film of material on the drying cylinder has a thickness of about 1 – 2 mm.

The film of material which forms on the drying cylinder rotates with the cylinder surface about a circumferential angle of typically 270°, whereby moisture is withdrawn from it to an ever increasing degree. While the film of material is still in a malleable or thermoplastic state, it is peeled off the drying cylinder by means of a scraping knife with a pointed blade, which is pressed against the cylinder surface. From the scraping knife, it then traverses a relatively short distance in the opposite direction, which is preferably 16 – 20 mm. long. This distance is traversed free, that is, without any support. It then reaches a smooth sheet metal guide, which is suitably inclined, and which ends at a short distance from the surface of the drying cylinder. The film of material is guided in this way to a running transport belt which carries it along. The transport belt consists, for example, of an endless wire mesh, or is provided with some other rough surface so as to be able to pull along the film.

In the region where the hitherto smooth film of material is peeled off, that is shortly before, on, and behind the scraping knife, and even on the subsequent sheet metal guide, continuous packing, compression, restraint, and/or, if necessary, pulling and stretching takes place. This results in the formation of the characteristic structure of fruit flakes, in accordance with the invention. The structure has the form of a preferably irregular corrugation, knurling, or waffle-like shape, with alternating thicker and thinner thicknesses. This structure begins to appear at the scraping knife and at the subsequent free path between scraping knife and sheet metal guide. Its formation, however, often still continues while the film of material is moved from the sheet metal guide to the transport belt. Air is blown over the entire width of the film of material, underneath the peeled-off film and between the film and the sheet metal guide. The air is obtained, for example, from an air nozzle.

The structure formation in the film of material can be varied by varying the circumferential speed of the drying cylinder and the running speed of the transport belt.

Braking the run-off speed will cause compression of the material while increasing this speed will stretch the film. The material film also depends, among other factors, on the effect of the sugar content and of caramelization. It should be noted that the process can, if desired, also be performed in vacuum.

Further drying of the structured material film may occur on the transport belt, and can generally be performed at normal room temperature. Normally, at approximately the end of the first third of the entire length of the transport belt, the material is substantially completely dry. Up to the end of the conveyor belt, the material usually has been running along in its full width. At this point it may be cut into lengthwise strips of adjustable width, and divided, either simultaneously or subsequently, in the perpendicular direction, to form flakes or wafers of the desired size. This can be done, for example, especially simply by pushing the film strip of material beyond the end of the transport belt, so that it protrudes freely, until its own weight or some external force causes it to break off and fall down. This essentially completes the fabrication process, and the dry, crispy fruit flakes or wafers can be gathered, transported, and packed.

While only a limited number of embodiments have been expressly disclosed, the invention is, nonetheless, to be broadly construed and not to be limited except by the character of the claims appended hereto.

What is claimed is:

1. A process for the production of fruit flakes comprising applying a moist mass consisting essentially of fruit pulp, sugar added to said pulp and starchy material added to said pulp, to a hot smooth rotating cylindrical substrate in a thin layer, said fruit pulp being about 80 to 85 percent by weight of said moist mass, said added sugar being about 5 to 10 percent by weight of said moist mass and said added starchy material being about 5 to 10 percent by weight of said moist mass, maintaining the substrate at a temperature sufficient to cause caramelization of said moist mass, at least partially dehydrating said layer to form a cohesive film, peeling said film from said substrate and forming said film into an irregular structure, drying said film until it is brittle, and dividing said film into flakes.

2. A process according to claim 1 wherein said forming comprises pulling, pushing, compressing; restraining or stretching said film as it is being removed from said substrate whereby said film is corrugated, curled or waffled with varying thicknesses.

3. A process according to claim 1 wherein said substrate is heated to 110° to 140° C.

4. A process according to claim 3 wherein said substrate is heated by saturated steam at about 4 to 6 atmospheres.

5. A process according to claim 1 wherein vapors formed during said dehydrating are pumped off.

6. A process according to claim 1 wherein said peeling is carried out by a scraping knife.

7. A process according to claim 1 comprising causing said film to freely traverse a relatively short path after leaving said substrate.

8. A process according to claim 7 wherein said short path is approximately 16 to 20 mm.

9. A process according to claim 7 wherein, after freely traversing said path, said film is placed on a moving support and air is blown underneath said film.

10. A process according to claim 7 wherein the speed of said support and the speed of said peeling are different whereby said film is compressed or stretched.

11. A process according to claim 1 wherein said film after said dehydrating is cut lengthwise and divided crosswise into flakes.

12. A process according to claim 9 wherein said film is pushed over the end of said support so as to protrude freely, permitting said film to break off in the form of flakes.

13. A process according to claim 1 wherein said film is 1 to 2 mm. thick while on said substrate.

14. A process according to claim 1 wherein said mass has a weight ratio of wet material to dry material of about 3 to 1.

15. A process according to claim 1 wherein said mass contains 80 to 85% pulp, 5 to 10% added sugar and 5 to 10% added starchy material, all percents being by weight.

16. A process according to claim 1 carried out under vacuum.

17. A process according to claim 1 wherein said starchy material is corn meal.

18. Fruit flakes consisting essentially of a dried mass of fruit pulp, added sugar, added starchy materials and having an irregular, corrugated, knurled, or waffled structure with varying thicknesses.

* * * * *